(12) United States Patent
Nielson

(10) Patent No.: US 12,296,501 B2
(45) Date of Patent: May 13, 2025

(54) SYSTEM AND METHOD FOR MANUFACTURING ARCHITECTURAL BLOCKS WITH STONE-LIKE APPEARANCE

(71) Applicant: TUSCAN STONEWORX USA, LLC, Orem, UT (US)

(72) Inventor: Mat T. Nielson, Orem, UT (US)

(73) Assignee: TUSCAN STONEWORX USA, LLC, Orem, UT (US)

( * ) Notice: Subject to any disclaimer, the term of this patent is extended or adjusted under 35 U.S.C. 154(b) by 84 days.

(21) Appl. No.: 18/144,591

(22) Filed: May 8, 2023

(65) Prior Publication Data

US 2023/0364825 A1    Nov. 16, 2023

Related U.S. Application Data

(60) Provisional application No. 63/340,342, filed on May 10, 2022.

(51) Int. Cl.
| | |
|---|---|
| *B32B 3/20* | (2006.01) |
| *B28B 3/20* | (2006.01) |
| *B28B 19/00* | (2006.01) |
| *E04C 1/40* | (2006.01) |
| *E04B 2/86* | (2006.01) |

(52) U.S. Cl.
CPC .......... *B28B 3/205* (2013.01); *B28B 19/0053* (2013.01); *E04C 1/40* (2013.01); *E04B 2/86* (2013.01)

(58) Field of Classification Search
None
See application file for complete search history.

(56) References Cited

U.S. PATENT DOCUMENTS

| | | | |
|---|---|---|---|
| 772,476 | A | 10/1904 | Podmore |
| 2,588,595 | A | 3/1952 | Warner |
| 2,601,532 | A | 6/1952 | Knighton |
| 2,751,775 | A | 6/1956 | Sergovic |
| 3,155,529 | A | 11/1964 | Paturzo |

(Continued)

FOREIGN PATENT DOCUMENTS

| | | |
|---|---|---|
| CN | 101480784 A | 7/2009 |
| FR | 2564124 A1 | 11/1985 |

(Continued)

*Primary Examiner* — Mohammad M Ameen
(74) *Attorney, Agent, or Firm* — Workman Nydegger

(57) ABSTRACT

Apparatus, systems, and methods for applying plaster compositions to block substrates to yield a product having the appearance of cut stone. An example apparatus includes: a manifold; a mold connected to the manifold with a channel to receive the block substrate; a delivery hose connected to a top of the manifold to deliver plaster composition to the manifold for application to the block substrate; a pressure release hose connected to the manifold; and a vibrating mechanism connected to the mold. A system further includes a conveyor that moves block substrates through the mold. An example method includes: wetting a surface of a block substrate; moving the block substrate through an application apparatus as described, applying a layer of plaster composition to a surface of the block substrate, vibrating the mold and block substrate during application of the plaster composition, and allowing the plaster composition to harden.

20 Claims, 15 Drawing Sheets

(56) References Cited

U.S. PATENT DOCUMENTS

| | | | |
|---|---|---|---|
| 3,712,825 A | | 1/1973 | Yocum |
| 3,799,716 A | | 3/1974 | Salts |
| 3,853,577 A | | 12/1974 | Nishida et al. |
| 5,002,620 A | | 3/1991 | King |
| 5,794,401 A | | 8/1998 | Shaw et al. |
| 6,528,120 B2 | | 3/2003 | Brown |
| 6,569,923 B1 | | 5/2003 | Slagter |
| 11,325,279 B2 | | 5/2022 | Nielsen |
| 2002/0157577 A1 | | 10/2002 | Sullivan |
| 2006/0113693 A1 | * | 6/2006 | McBain .............. B29C 37/0028 264/328.8 |
| 2017/0298626 A1 | | 10/2017 | Shaw |
| 2018/0230057 A1 | | 8/2018 | Guynn |
| 2019/0099915 A1 | | 4/2019 | Adams et al. |
| 2019/0308342 A1 | * | 10/2019 | Butler ............... B01F 25/43161 |
| 2020/0198181 A1 | * | 6/2020 | Nielsen .................. C04B 28/04 |

FOREIGN PATENT DOCUMENTS

| | | | | |
|---|---|---|---|---|
| GB | 0624377 A | | 6/1949 | |
| KR | 10-0737433 B1 | | 7/2007 | |
| WO | WO-2015057729 A2 | * | 4/2015 | ......... B01D 46/2418 |

* cited by examiner

SYSTEM AND METHOD FOR MANUFACTURING ARCHITECTURAL BLOCKS WITH STONE-LIKE APPEARANCE

CROSS-REFERENCE TO RELATED APPLICATIONS

This Application claims the benefit of U.S. Provisional Application No. 63/340,342, filed May 10, 2022, which is incorporated by reference in its entirety.

BACKGROUND

Technical Field

This disclosure relates generally to apparatus, systems, and methods for manufacturing architectural blocks.

Related Technology

Building structures such as walls are often built by organizing several individual masonry units into the structure. The masonry units may be pieces of cut stone, such as marble, granite, travertine, sandstone, or limestone. More frequently, the masonry units are some form of brick, whether fired clay or made from concrete. Bricks are typically laid together in an alternating pattern of offset courses and joined together using mortar. The relatively smaller bricks often seen in residential applications are typically made of clay combined with sand or other type of aggregate. These bricks are usually fired to provide suitable strength.

Concrete can be utilized to form masonry units. Masonry units formed from concrete are often referred to as cinder blocks, breeze blocks, hollow blocks, construction blocks, clinker blocks, and Besser blocks. The terms "concrete blocks" and "concrete masonry unit" (CMU) are often used to generally refer to all such varieties. Concrete blocks are made from cast concrete, which typically includes Portland cement, water, and a suitable aggregate material. The concrete sets up and develops strength by hydration of the Portland cement. Lower cost concrete blocks often use industrial wastes such as low-quality fly ash or bottom ash as at least part of the aggregate. This is why such blocks are commonly referred to as "cinder blocks" in the U.S.

Concrete blocks are useful, low-cost building units and are particularly beneficial for forming walls of buildings. Concrete blocks can be utilized for structural and/or architectural purposes. When properly reinforced, CMUs can support structural loads. Despite these benefits, concrete blocks are typically considered to be unsightly or too "industrial" for many residential or business environments. They are most often used for utilitarian purposes of low esthetic value.

Insulating concrete forms (ICFs) are another type of structural units that are an energy and cost-efficient alternative to cinderblocks and concrete walls. Generally, ICFs comprise a rigid insulating layer forming exterior and/or interior wall substrates. The forms can comprise modular interlocking units that can be stacked, reinforced, and back-filled with concrete to form structural walls or floors of a building. Once locked in place, the interior space between inner and outer walls of the ICFs is filled with concrete. Reinforcing steel bars ("rebar") can be placed inside of the ICFs before concrete is poured to give the concrete increased tensile and flexural strength.

ICFs are increasingly used to satisfy energy-efficient building codes and natural disaster resistant building codes. ICFs may also provide additional building enhancements including soundproofing, space to run electrical and plumbing, backing for finishes, improved indoor air quality and climate control.

However, ICFs, similar to concrete and cinderblocks, lack aesthetic appeal and incur additional costs in labor and materials in order to apply aesthetic coverings. Many preferred coverings may include high-quality stone or brick, which can be costly and are labor-intensive to install.

What is needed is a low cost and aesthetically pleasing alternative to CMUs and ICFs.

SUMMARY

Disclosed are apparatuses, systems, and methods for applying plaster compositions to block substrates, such as concrete blocks and insulating concrete forms to make architectural products. In some embodiments, an apparatus for applying a plaster composition to a concrete or other block substrate, or other block substrate, includes a mold, a manifold, a pressurized delivery hose connected to the top of the manifold, a vibrating mechanism adjacent to the manifold, a mold, and a shaping mechanism at the exit of the manifold or mold. The mold includes a channel that is sized and shaped to receive the block substrates. The shaping mechanism may be incorporated into the mold, such as at an exit end of the mold. Additionally, and/or alternatively, the shaping mechanism may be attached to, or incorporated into, the manifold, such as at the exit of the manifold. The apparatus may further include a pressure release/overflow hose connected to the manifold. The pressurized delivery hose applies the plaster composition to the block substrate through the manifold as the block substrate moves inside and through the channel of the mold.

Examples of block substrates include, for example, concrete blocks such as standard concrete masonry units (CMUs). Alternatively, block substrates made of fired clay, ceramic, unfired clay, or other materials can be used. The apparatuses, systems, and methods are configured to apply a plaster coating to at least one surface of the block substrates, wherein the plaster coating is advantageously a cementitious composition formulated to give the appearance of cut stone, such after hardening and finishing of the plaster coating.

Architectural blocks may also include, for example, lightweight block substrates. Lightweight block substrates are typically made from a lightweight polymer, such as molded expanded polystyrene (EPS), polyurethane, and the like, and can have any desired configuration. In some embodiments, the lightweight block substrate can have a shape similar to conventional CMUs, bricks, or other building blocks. In another embodiment, the lightweight block substrate can be an insulated concrete form (ICF). The apparatuses, systems, and methods are configured to apply a plaster coating to at least one surface of the lightweight blocks, wherein the plaster coating is advantageously a cementitious composition formulated to give the appearance of cut stone, such after hardening and finishing of the plaster coating.

Lightweight block substrates typically comprise a lightweight material having a density less than 1680 kg/m$^3$, such as less than about 1500 kg/m$^3$, or less than about 1250 kg/m$^3$, or less than about 1000 kg/m$^3$, or less than about 750 kg/m$^3$, or less than about 500 kg/m$^3$, or less than about 300 kg/m$^3$, or less than about 200 kg/m$^3$, or less than about 150 kg/m$^3$, or less than about 100 kg/m$^3$, or less than about 80 kg/m$^3$, or less than about 60 kg/m$^3$.

In some embodiments, the plaster composition includes a cementitious binder component, water, an aggregate, and one or more admixtures. The plaster composition can be the same as or similar to stucco. The cementitious binder may include Portland cement, such as white cement or grey cement, alone or in combination with one or more supplementary cementitious materials (SCMs), such as fly ash, metakaolin, pumice, natural pozzolan, ground metallurgical slag, or silica fume. In some embodiments, an adhesive that promotes bonding of the plaster composition to the substrate may be included. In some embodiments, an internal sealer can be incorporated into the plaster composition. The initially fresh plaster composition sets up and develops strength over time through hydration of the Portland cement. SCMs can react with excess lime (CaO) released during Portland cement hydration via the pozzolanic reaction. In the presence of water, lime is converted to hydrated lime, i.e., calcium hydroxide ($Ca(OH)_2$).

In some embodiments, the aggregate component can be one or more limestone aggregates, one or more silica aggregates, or a combination of limestone and silica aggregates of the same or different size. In some embodiments, at least two gradations (or sizes) of aggregate can be used, such as two differently sized limestone aggregates, two differently sized silica aggregates, or a combination of differently sized limestone and silica aggregates.

In some embodiments, the aggregate component may include a fine sand portion and a coarse sand portion. The fine sand portion, which may be considered to be a filler and not an SCM, may have, for example, a D90 within a range of about 0.075 mm to 0.425 mm, or about 0.105 mm to 0.300 mm, or about 0.150 mm to 0.212 mm, and a D50 of 0.075 mm or less. The coarse sand portion may have, for example, a D90 within a range of about 0.425 mm to 2.80 mm, or about 0.60 mm to 1.70 mm, a D50 within a range of about 0.212 mm to 0.60 mm, or about 0.300 mm to 0.425 mm, and a D10 within a range of about 0.075 mm to 0.212 mm, or about 0.105 mm to 0.150 mm.

The use of two separate gradations of aggregate improves rheology and beneficially provides the appearance of real cut stone after the plaster composition has cured and finished. For example, the fine sand portion can provide workability and texture to the plaster while exposed grains of the coarse sand portion can provide the appearance of distributed crystal facets to the finished surface of the plaster. The resulting appearance beneficially resembles that of real cut stone.

A method of manufacturing an architectural block includes the steps of providing a block substrate, making a fresh plaster composition by mixing a cementitious binder component, water, aggregate, and optionally one or more admixtures, and applying the fresh plaster composition to at least one surface of the block substrate to form an intermediate architectural block comprising the block substrate and one or more plaster layers. The formed plaster layer, before initial set and while in a plastic or flowable state, may be shaped, e.g., leveled, by at least a portion of the application apparatus. Thereafter, the plaster layer is allowed to harden or cure.

Also disclosed herein are systems for manufacturing architectural blocks having the appearance of cut stone. In one embodiment, a system for manufacturing architectural blocks includes a conveyance system configured to convey one or more block substrates and an application apparatus to receive the block substrates and apply a fresh plaster composition to at least one surface of the substrate. The application apparatus includes a pressurized delivery hose or conduit, a pressure release hose or conduit, a vibrating mechanism, and a shaping mechanism. The system may also include a damper to maintain a desired position of the block substrate while on the conveyance system and during application of the plaster composition. The system may additionally include one or more of: a pre-wetting zone to prewet the block surface before applying the plaster composition and a holding section for allowing the plaster layer to harden or cure prior to finishing.

Beneficially, the disclosed apparatuses, systems, and methods produce architectural blocks, or coated block substrates, that have the appearance of cut stone. Such appearance can add to, and/or improve, the aesthetic look of structures built from the architectural blocks or coated block substrates. The architectural blocks can be utilized with less expense and with greater design freedom as compared to actual cut stone. As some embodiments incorporate a sealant into the plaster composition, the architectural blocks produced are resilient and can resist weathering conditions, such as rain, snow, wind, freeze-thaw cycles, and heat (e.g., sun exposure). Use of SCMs can reduce or eliminate efflorescence.

Also beneficially, the disclosed apparatuses, systems, and methods produce architectural blocks having the appearance of cut stone and that have fewer air pockets or bubbles than blocks produced by other methods. This reduction in air bubbles and pockets provides increased stability to the cut stone appearance of the architectural block, reducing or eliminating the tendency of the plaster layer to fail or break.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

BRIEF DESCRIPTION OF THE DRAWINGS

Various objects, features, characteristics, and advantages of the invention will become apparent and more readily appreciated from the following description of the embodiments, taken in conjunction with the accompanying drawings and the appended claims, all of which form a part of this specification. In the Drawings, like reference numerals may be utilized to designate corresponding or similar parts in the various Figures, and the various elements depicted are not necessarily drawn to scale, wherein:

DETAILED DESCRIPTION

Figure 1:
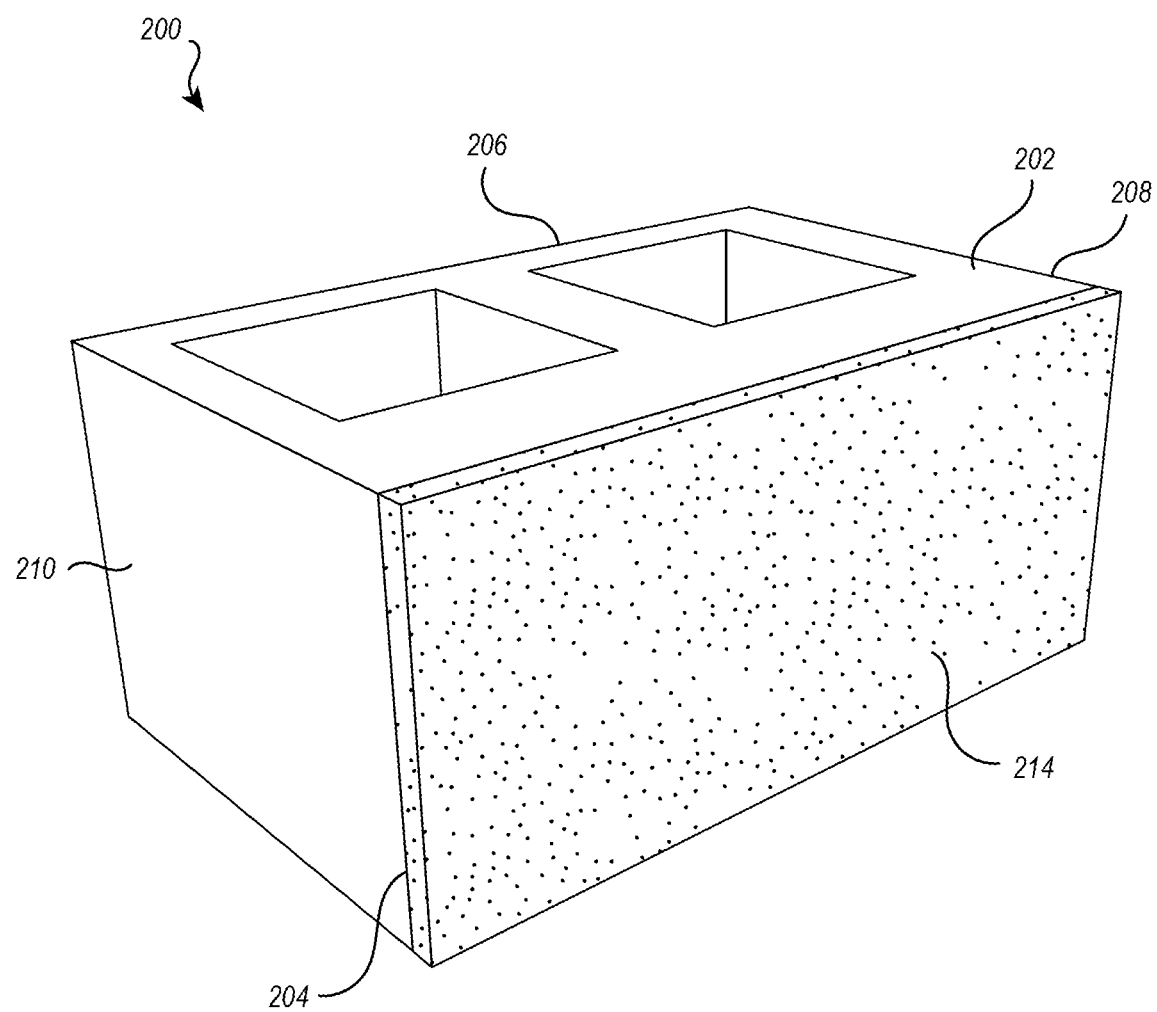
FIG. 1 is a perspective view of an example architectural block including a block substrate surface that has been formed or treated with a plaster composition that provides an aesthetic surface, such as the appearance of natural or cut stone.

Disclosed are apparatuses, systems, and methods for applying a plaster coating to block substrates, such as concrete blocks, sintered blocks, ceramic blocks, polymer blocks, and lightweight block substrates. In some embodiments, an apparatus for applying a plaster composition to a block substrate includes a mold, a manifold connected to the mold, a pressurized delivery hose or conduit connected to the top of the manifold, and a vibrating mechanism adjacent to the manifold. The apparatus may further include a pressure release hose or conduit connected to the manifold. The mold includes a channel that is sized and shaped to receive a block substrate and apply a fresh plaster composition to at least one surface of the block substrate. The pressurized delivery hose delivers fresh plaster composition to the manifold, which distributes and applied a layer of fresh plaster composition to the block substrate while the block substrate is inside and moving through the channel of the mold.

A method of manufacturing an architectural block includes the steps of providing a block substrate and applying a fresh plaster composition to at least one surface of the block substrate to form an intermediate architectural block comprising the block substrate and one or more plaster layers. Vibration of the plaster application apparatus helps reduce or eliminate air bubbles and other defects that may otherwise form or be present in the absence of vibration. The freshly formed plaster layer(s) may be leveled by the mold or a shaping mechanism attached to and/or associated with the mold as the block substrate is moved through the mold.

Following sufficient hardening or curing of the plaster layer, a polymer or other sealant may be applied to the finished surface to seal, waterproof, and/or protect the plaster layer. Additionally, and/or alternatively, a polymer or internal sealant may be incorporated into the fresh plaster composition that is applied to the block substrate.

Also disclosed are systems for manufacturing architectural blocks having the appearance of cut stone. In one embodiment, a system for manufacturing architectural blocks includes a conveyance system configured to convey block substrates, an application apparatus to receive the block substrates and apply a fresh plaster coating, the application apparatus including a manifold, a pressurized delivery hose or conduit, a pressure release hose or conduit, a vibrating mechanism, and a shaping mechanism. The system may also include a damper to maintain a position of the block substrate while it is on the conveyance system and during application of the fresh plaster composition. The system may additionally include one or more of: a sprayer upstream from the application apparatus configured to pre-wet an application surface of the block substrates, a holding section downstream from the application apparatus for allowing the plaster layer to harden or cure, a cleaner configured to remove residual debris, and a sealer station configured to apply a sealer to the hardened or cured surface of the plaster layer.

Architectural Blocks and Block Substrates

The architectural blocks described herein are block substrates that have been modified by applying a plaster composition to at least one surface of a block substrate. The block substrate can be a standard concrete masonry unit (CMU), fired clay brick, ceramic block, or unfired clay block. In some embodiments, the block substrate may alternatively be an insulated concrete form (ICF), a structural tile, gypsum block, polymer block, or other construction unit capable of being arranged with multiple units to form a building structure. For simplicity, the following description will use the term "block" or "block substrate" to refer generally to the foregoing types of base substrates and similar substrates known in the art.

Particularly preferred embodiments utilize CMUs or ICFs as block substrates, though it will be understood that the embodiments described herein are not limited solely to CMUs or ICFs. In the United States, CMUs are commonly sized at about 16 in×8 in×8 in, though they may be varied in one or more dimensions by ±4 to 10 inches. For example, it may be desirable to use a CMU that is 24 in×8 in×8 in.

In another embodiment, the block substrate can be an insulated concrete form (ICF). ICFs typically comprise a lightweight material having a density less than 1680 kg/m$^3$, such as less than about 1500 kg/m$^3$, or less than about 1250 kg/m$^3$, or less than about 1000 kg/m$^3$, or less than about 750 kg/m$^3$, or less than about 500 kg/m$^3$, or less than about 300 kg/m$^3$, or less than about 200 kg/m$^3$, or less than about 150 kg/m$^3$, or less than about 100 kg/m$^3$, or less than about 80 kg/m$^3$, or less than about 60 kg/m$^3$.

FIG. 1 illustrates an example architectural block 200 including a block substrate 202 having front and back sides 204, 206 and an aesthetic plaster coating layer 214 disposed on at least one side (e.g., front side 204). The block substrate 202 also has first and second opposing ends 208, 210. The cuboid shape (e.g., a three-dimensional rectangular prism) of block substrate 202 illustrated in FIG. 1 can be the same as or similar to typical cinder blocks (e.g., CMU blocks) known in the art, though other embodiments may be shaped differently so long as they can be arranged with other blocks to form a building structure. For example, other examples of block embodiments may have a cube shape, a trapezoidal prism shape, a panel/tile shape, a shape with a polygonal cross-section, or a shape with one or more curved surfaces. Additionally, or alternatively, some embodiments may include corners and/or edges that are rounded, beveled, chamfered, and the like.

In some embodiments, only one side of the block substrate 202 includes or is treated with a plaster, stucco, or other aesthetic coating composition (collectively "plaster composition") to form the aesthetic coating layer 214. Once multiple architectural blocks 200 have been arranged to form a building structure, the aesthetic coating layer 214 is usually the only surface that remains visible. In some cases, grooves or recesses may be provided to receive grout, which can complete the finished appearance of layered and staggered stone. However, other surfaces may also be treated according to the needs of a particular application. For example, corner and end pieces may have two or more exposed surfaces following formation of the building structure that can have a plaster coating. In some cases, opposing surfaces may remain visible after construction, such as where the architectural blocks are used to form a partition wall that remains visible from either side of the wall following construction. In such cases, both sides 204, 206 of the block substrate 202 may be treated to have an aesthetic coating layer 214.

Figure 2:
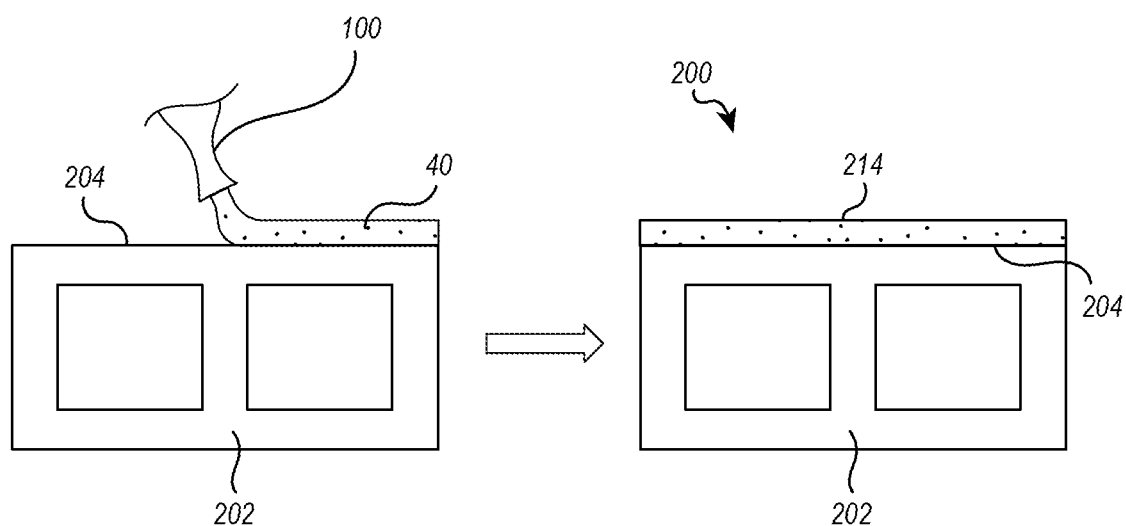
FIG. 2 schematically illustrates a fresh plaster coating composition being applied to the block substrate of FIG. 1.

FIG. 2 illustrates a schematic overview of an application apparatus 100 applying a plaster composition 40 to the front side 204 of the block substrate 202 of FIG. 1.

Figure 3A:
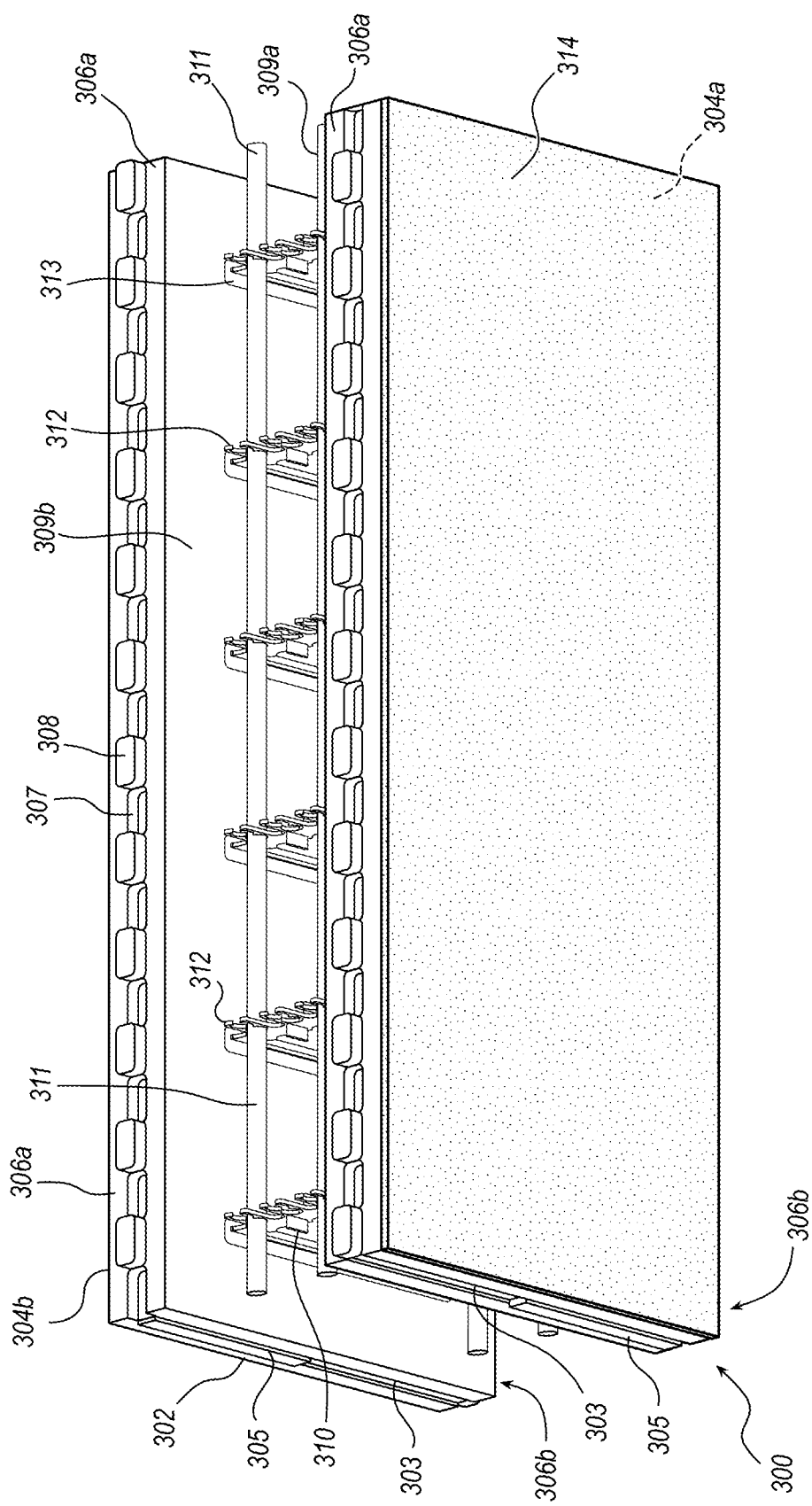
FIG. 3A is a perspective view of an exemplary lightweight block formed using an ICF as a lightweight substrate and including an aesthetic plaster coating.
Figure 3B:
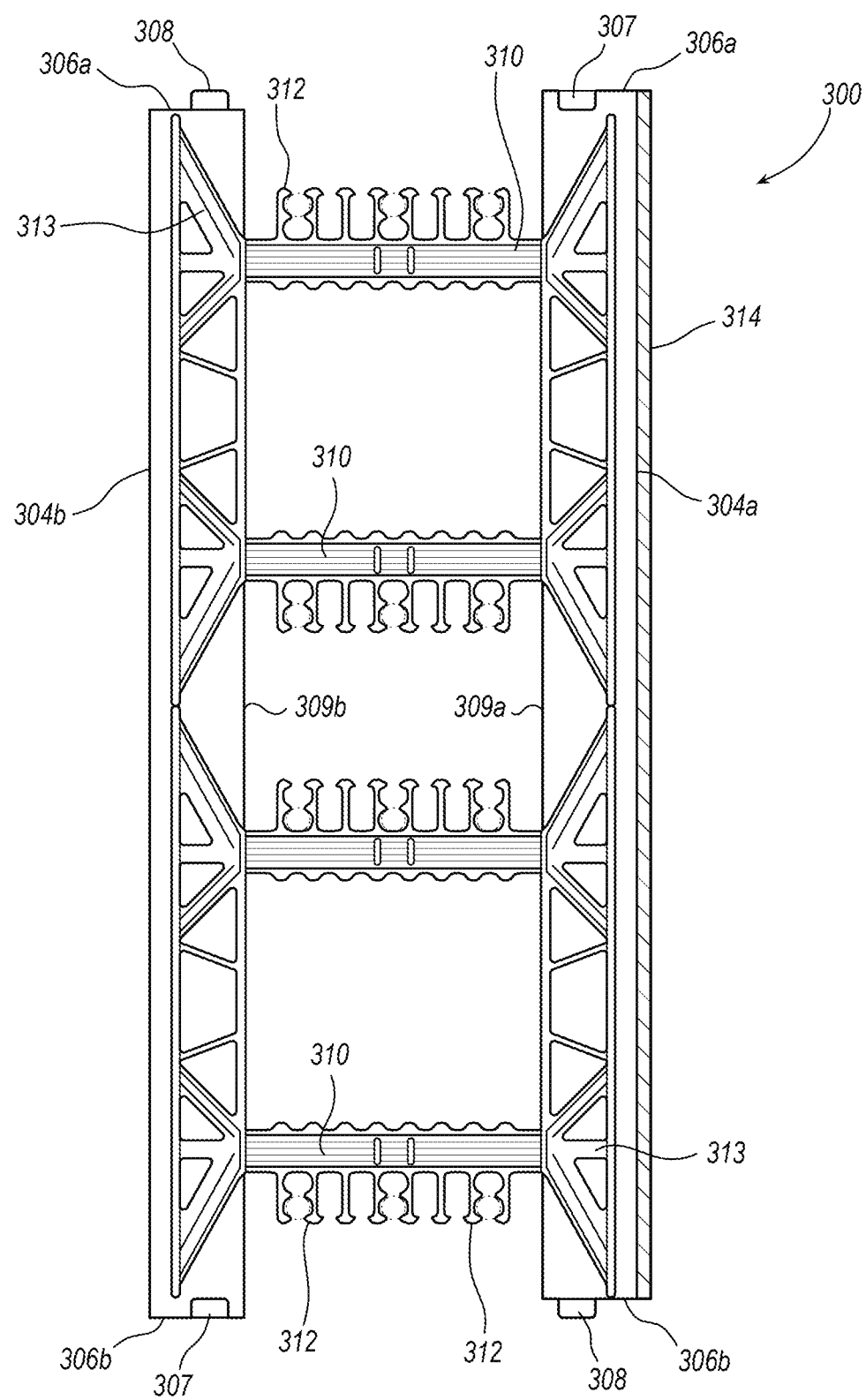
FIG. 3B is a top plan view of the lightweight block and aesthetic plaster coating of FIG. 3A.

FIGS. 3A-3B illustrate an example of a lightweight architectural block 300 including an insulating concrete form (ICF) as the block substrate 302, which can be modified to include an aesthetic coating layer 314 on a front side 304a similar to aesthetic coating layer 214 on a side of block substrate 203 of FIG. 1. Accordingly, a similar process can be used to form the aesthetic coating layer 314 on the front side 304a of the lightweight block substrate 302. The back side 304b can remain uncoated, as shown, or it can be coated with a plaster coating layer (not shown).

Lightweight architectural block 300 can be stackable such that multiple lightweight architectural blocks 300 can be stacked in a number of configurations in order to form a wall. For example, the lightweight architectural blocks 300 can be straight blocks, corner blocks (not shown), T blocks (not shown), curved blocks (not shown), angled blocks (not shown), and the like.

Lightweight architectural block 300 can be modular and have interlocking features, providing for stabilization of multiple blocks 300 during assembly to form a wall form. For example, in one embodiment, a top surface 306a of a first lightweight architectural block 300 can include a series of alternating depressions 307 and protuberances 308 that can mate with corresponding depressions and protuberances (not shown) on a bottom surface 306b of a second lightweight architectural block 300 when the second lightweight architectural block 300 is placed on top of the first lightweight architectural block 300. The front and back sides 304a, 304b of the lightweight architectural block 300 can include alternating end depressions 303 and protrusions 305, which can mate and interlock with corresponding end depressions and protrusions of adjacent blocks (not shown), in order to establish and maintain block alignment. Examples of lightweight architectural blocks 300 are illustrated and described in U.S. patent application Ser. No. 17/198,642, filed Mar. 22, 2021, the entire contents of which are incorporated herein by reference.

As further illustrated in FIGS. 3A and 3B, a lightweight block substrate 302 can include a first inner side 309a and an opposing second inner side 309b, which are spaced apart and joined together by a plurality of supports 310. As shown in FIG. 3B, the supports 310 can include fastening ends 313 integrally formed or embedded within the front and back sides 304a, 304b of the block substrate 302. In this embodiment, the lightweight block substrate 302 can function as a form that includes an interior region into which fresh concrete can be poured or pumped to create a concrete structural wall between the front and back sides 304a, 304b. The supports 310 can include locking features 312 configured to hold and retain one or more reinforcement bars 311, which will remain embedded within and add strength to the hardened concrete.

In some embodiments, only one side, e.g., front side 304a is molded onto or integrally formed with supports 310, such as for example, when the modular block comprises a front side 304a comprising a polymer substrate material and a back side (not shown) that is a temporary form (e.g., wood), that can be removed after the concrete has hardened to form an exposed concrete surface (not shown).

One or more of front and back sides 304a, 304b of the lightweight modular block substrate 300 can have a textured surface that promotes the bonding of an aesthetic coating (e.g., plaster or stucco composition 314) to a side 304 of the lightweight block 300. The one or more sides 304 can be formed of a low-density material. For example, the low-density material may comprise lightweight foam concrete, lightweight foam ceramic, expanded polystyrene (EPS), extruded polystyrene foam (XPS), polyurethane foam, cement-bonded wood fiber, cement-bonded polystyrene beads, cellular concrete, or similar materials.

Figure 4:
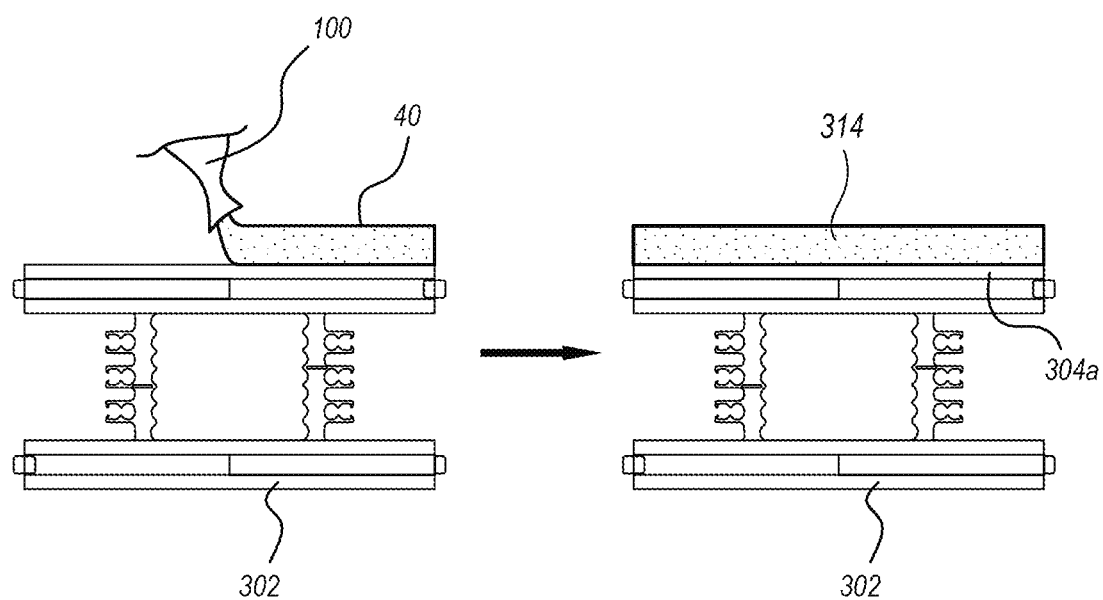
FIG. 4 schematically illustrates a fresh plaster composition being applied to a lightweight block substrate, such as the ICF block substrate of FIG. 3A.

FIG. 4 illustrates a schematic overview of an application apparatus 100 applying a plaster composition 40 to a front surface 304a of the block substrate 302 of FIG. 3.

The plaster compositions that are applied to block substrates are formulated to provide a desired decorative appearance to the treated surface of the block substrate. The plaster composition may, for example, provide the appearance of cut stone. The resulting architectural block can therefore be utilized in architectural and/or decorative applications with less expense and with greater design freedom as compared to actual cut stone. The block substrates and the manufacturing methods used to form the architectural blocks provide a less expensive and/or lower weight alternative to natural or cut stone.

Because the architectural blocks are made using a hollow or lightweight block substrate, they will typically have a weight that is significantly less than a similarly sized piece of solid natural or cut stone. Lightweight architectural blocks can therefore provide aesthetic benefits of natural or cut stone while reducing limitations associated with cost, weight, and/or supply of stone.

Further, using natural or cut stone may involve difficulties in finding a proper supply of stone. In other words, the use of natural stone may require an extensive search for a proper supply that meets size and/or composition and/or aesthetic requirements. On the other hand, the lightweight architectural block products described herein are capable of controlled manufacture according to particular project requirements and can have an almost endless variety of colors and/or textures resembling stone or having a desired look.

FIGS. 2 and 4 illustrate example schematic application processes for applying plaster compositions to block substrates. Specifically, FIG. 2 illustrates an apparatus 100 for applying a plaster composition 40 to a block substrate 202, such as that illustrated in FIG. 1. FIG. 4 illustrates an apparatus 100 for applying a plaster composition 40 to a lightweight block 302, such as that illustrated in FIG. 3.

Plaster Compositions

The plaster composition may be formulated to include: 1) a cementitious binder component, 2) an aggregate component, preferably including at least two types and/or gradations of aggregate (e.g., limestone and/or silica aggregates), 3) a polymer or other sealant and optionally 4) an adhesive component. These are mixed with water to form a fresh plaster composition that is in a plastic or flowable state for application to the block substrate surface. In some embodiments, an internal sealer can be incorporated into the plaster composition. An example an internal sealer is KreteControl 230, which provides water repellence and efflorescence control and minimizes water penetration and absorption, improves service life, improves aesthetic appearance, and promotes and maintains brighter colors.

The fresh plaster composition may be applied to a block substrate and then caused or allowed to harden or cure to form a decorative surface layer 214, 314, such as illustrated in FIGS. 1 and 3. In preferred embodiments, the fresh plaster composition is free of chemically curable organic binders, such as epoxy resins and hardeners, in order for the cementitious binder to be the primary or sole binder.

The cementitious binder component is preferably white Portland cement. Although some embodiments may include ordinary (grey) Portland cement, the cementitious binder component is preferably 50% or more, 60% or more, 75% or more, or 90% or more, or 95% or more, or about 100% white Portland cement. A supplementary cementitious material may optionally be included, examples of which include fly ash, ground granulated blast furnace slag (GGBFS), metakaolin, silica fume, pumice, volcanic ash, ground glass, and natural pozzolan. The cementitious binder component may constitute about 15% to 45%, or more preferably about 20% to 40% (e.g., about 25% to 35%) of the weight of the plaster composition (excluding water).

The aggregate component may constitute about 55% to 85%, or more preferably about 60% to 80% (e.g., about 65% to 75%) of the weight of the plaster composition (excluding water). The aggregate component preferably includes at least two gradations of aggregate material. Beneficial results closely resembling the appearance of real cut stone have been shown when both a fine sand and a coarse sand are included in the aggregate component of the plaster composition.

The aggregate may include one or more gradations of limestone, one or more gradations of silica, or a combination thereof. Limestone is softer than silica and may be easier to sand. Silica may provide a more defined crystal structure and greater strength. An aggregate may include, for example, a fine limestone portion, and a coarse limestone and/or silica portion.

As used herein, the "fine" or "fine sand" portion of the aggregate is a sand having a D90 of about 0.425 mm or less (i.e., 90% or more of the material passes through a 40 mesh sieve), or about 0.300 mm or less (i.e., 90% or more of the material passes through a 50 mesh sieve) or even about 0.212 mm or less (i.e., 90% or more of the material passes through a 70 mesh sieve). For example, the D90 of the fine sand portion may be within a range of about 0.075 mm to 0.425 mm, or about 0.105 mm to 0.300 mm, or about 0.150 mm to 0.212 mm. The fine sand portion may also have a D50 that is about 0.075 mm or less (i.e., 50% or more of the material passes through a 200 mesh sieve). The fine sand may also be considered to be a filler rather than an SCM.

As used herein, the "coarse" or "coarse sand" portion of the aggregate is a sand or other particle having a D90 of greater than about 0.425 mm (i.e., less than 90% of material passes through a 40 mesh sieve), or greater than about 0.60 mm (i.e., less than 90% of material passes through a 30 mesh sieve). For example, the D90 of the coarse sand portion may be within a range of about 0.425 mm to 2.80 mm, or about 0.60 mm to 1.70 mm. The coarse sand portion may have a D50 within a range of about 0.212 mm to 0.60 mm, or about 0.300 mm to 0.425 mm. In addition, the coarse sand portion may have a D10 within a range of about 0.075 mm to 0.212 mm, or about 0.105 mm to 0.150 mm.

Plaster compositions having aggregates with such fine and coarse sand portions have been found to be effective to provide the appearance of cut stone. The fine sand portion enables effective application of the plaster to the treated surface of a block substrate and facilitates even coverage of the treated surface. At the same time, the coarse sand portion provides visible crystal facets that can be exposed by finishing (e.g., sanding and/or polishing) of the treated surface. These visible crystals resemble the appearance of crystals within real cut stone.

Adjusting the ratio of the fine aggregate portion to the coarse aggregate portion can enhance the resemblance to real cut stone. For example, the appearance of the treated surface was found to resemble real cut stone when the ratio of the fine aggregate portion to the coarse aggregate portion is about 1:9 to about 5:5, or more preferably about 2:8 to about 4:6. For example the fine aggregate portion may make up about 10% to about 50%, or about 20% to about 45%, or about 25% to about 40% of the weight of the aggregate component of the plaster composition, and the remainder may be made up of the coarse aggregate portion. These ratios were found to beneficially balance the different features of the fine and coarse aggregate portions to result in a plaster composition having good workability, finishability, and resemblance to real cut stone.

In some embodiments, the plaster composition may further include a sealant component, such as in an amount ranging from about 0.05% to 0.1%, or about 0.06% to 0.09%, or about 0.07% to 0.08% of the weight of the plaster composition (excluding water) or within a range defined by any two of the foregoing values. In some embodiments, the sealant is included at approximately 0.075% by weight of the plaster composition (excluding water). Beneficially, incorporating the sealant component into the plaster composition enables the plaster composition to withstand weathering conditions. The sealant component also enables the plaster composition to be more waterproof than unsealed concrete.

In some embodiments, the plaster composition may further include an adhesive component. The plaster composition may include an adhesive in an amount ranging from about 2% to 10%, or about 3% to 9%, or about 4% to 8% of the weight of the plaster composition (excluding water). In a preferred embodiment, the adhesive component is a latex or latex-based adhesive (e.g., polyvinyl acetate, polyvinyl alcohol, and the like), though other embodiments may additionally or alternatively utilize other adhesives such as those based on styrene, acrylonitrile, natural rubber, neoprene, polyurethane, and combinations thereof.

Inclusion of an adhesive component has been found to enhance the internal integrity of the plaster after it cures on the treated substrate surface. Additionally, the adhesive component aids in maintaining good contact and bond between the plaster composition and the substrate surface so that effective coverage and bonding can occur. The adhesive is particularly useful where the substrate to which the plaster composition is applied is made of a polymer or other hydrophobic material and/or where the surface is very smooth with few surface defects. It can also minimize sloughing, buckling, or other undesirable flows from occurring during application of the plaster composition, which thereby reduces the occurrence of these flaws or artifacts in the finished, cured product.

One or more additional components may also be included in the plaster composition to aid in application and/or to provide desired properties to the finished, cured product. For example, one or more dyes or colorants (e.g., white, cream, tan, brown, orange, red, etc.) may be included to provide a desired color scheme to the plaster and further aid in reproducing the appearance of real cut stone. A set retarder that slows down cement hydration can be included to extend working time of the plaster composition. In addition, and/or alternatively, a set accelerator may be included to speed up hardening for subsequent handling. Water reducers (i.e., that reduce the amount of water required to yield a plaster composition having desired flow or plastic behavior), rheology modifiers, and/or other admixtures known in the art can be included.

Systems and Methods of Manufacturing

Also disclosed are systems for manufacturing architectural blocks having a cut stone appearance. In some embodiments, a system includes an application apparatus, a conveyance system, a sprayer and a damper.

Figure 5:
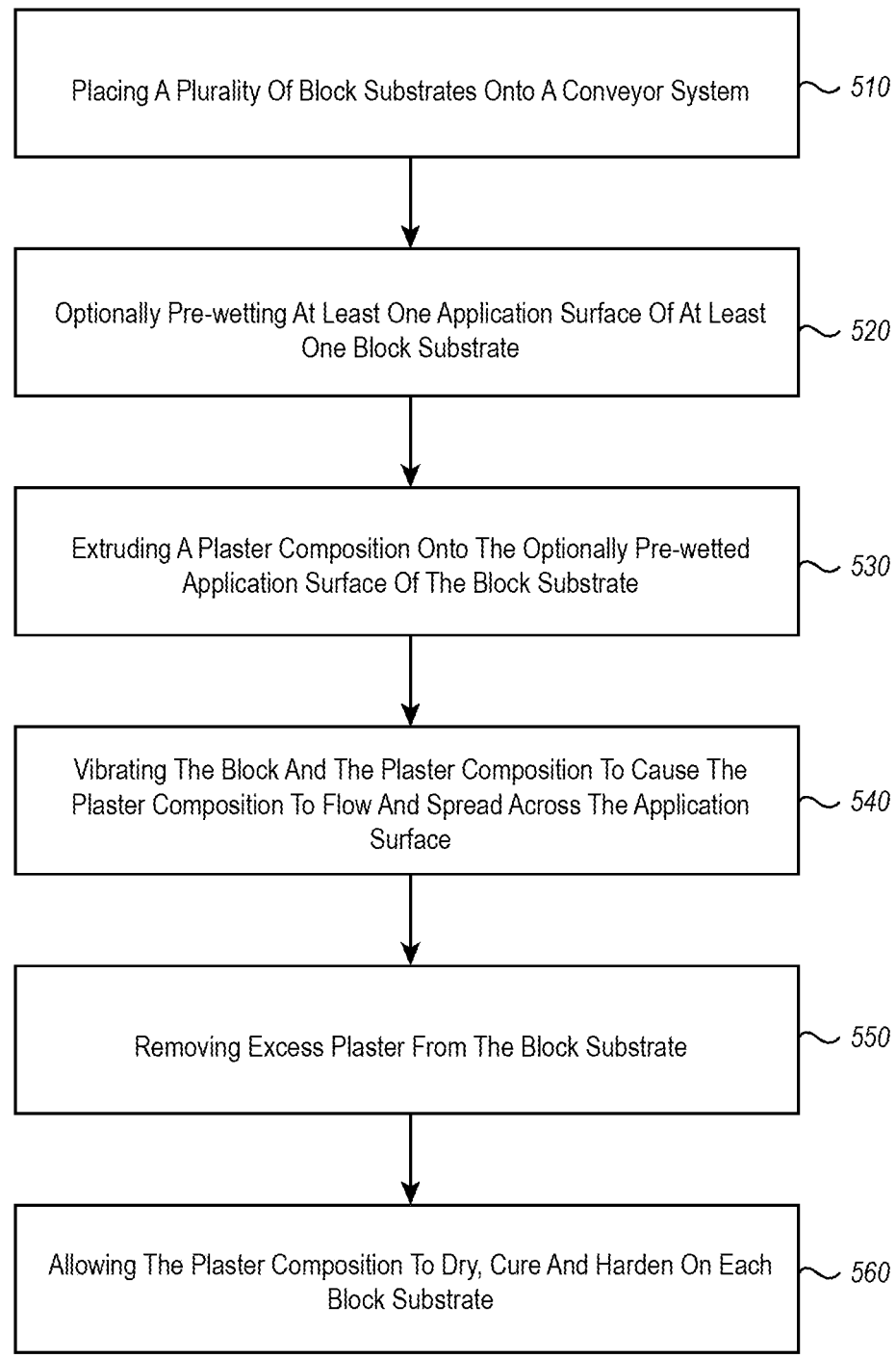
FIG. 5 is a flowchart of an example method for applying a plaster composition to a block substrate.

FIG. 5 illustrates a flowchart of an example plaster application process or method 500. The method 500 includes placing a plurality of block substrates onto a conveyor system at step 510. In some embodiments, the conveyor system is part of the overall application system, discussed more fully below. The plurality of block substrates can include CMU block substrates 202 (such as that in FIG. 1), lightweight ICF block substrates 302 (such as that in FIG. 3), or other block substrates known in the art.

The method 500 also includes pre-wetting at least one surface (e.g., at least one application surface) of the block substrate at step 520. Pre-wetting the at least one surface may include misting or spraying the at least one surface of the block substrate with, for example, water. Pre-wetting the at least one application surface of the block substrate beneficially prepares the at least one application surface for the application of a plaster composition, particularly where the block substrate is a CMU block or other porous block having high water absorption. Prewetting ICF blocks or other polymer blocks may be unnecessary.

Specifically, pre-wetting at least one application surface of the block surface beneficially at least partially saturates pores in the block substrate (e.g., pores at least at the surface of the block substrate) in the case of a concrete block. The pores in the block substrate typically absorb water present on the surfaces of the block substrate. As described more fully above, the disclosed plaster compositions include water as a component. If the pores of the block substrate are not treated with water prior to application of the plaster, the pores can absorb water present in the plaster composition at the interface. This can cause excess drying and/or shrinkage of the plaster composition at the interface and cause the applied plaster composition to crack during drying and/or hardening. Further, drying and/or shrinkage at the bond interface can lead to a weaker bond between the block substrate and the applied plaster, meaning the plaster might crumble and/or break away from the block substrate. Pre-wetting the application surface of the block substrate beneficially avoids the problems of the plaster cracking and poor bonding between the plaster and the block substrate.

In the case of a polymer or other non-concrete block substrate, the step of pre-wetting may be omitted. Alternatively, the water may include an adhesive or water-borne bonding agent that improves bonding of the plaster composition to the block substrate. The adhesive may also be included when applying the plastic composition to other block substrates, even concrete blocks.

The method 500 further includes extruding (or applying) a plaster composition onto the optionally prewetted application surface of the block substrate at step 530. As described more fully below, an application apparatus extrudes and/or applies the plaster composition. The plaster composition may be delivered to the application apparatus under a first pressure and the application apparatus may extrude and/or apply the plaster composition under a second pressure. The first and second pressures may be the same. Alternatively, the first and second pressures may be different. The first pressure may range from about 20-40 psi. The second pressure may range from about 10-35 psi.

The method 500 further includes vibrating the block substrate and plaster composition at step 540. Vibrating the block substrate and plaster composition causes the plaster composition to more uniformly flow and spread across the at least one application surface of the block substrate. Beneficially, vibrating the plaster composition also removes air bubbles in the plaster composition as it is applied to the application surface of the block substrate. Further beneficially, vibrating the block substrate causes the plaster composition to flow into and fill the pores in the block substrate, enabling a stronger bond between the plaster composition and the at least one application surface of the block substrate.

The method 500 includes removing excess plaster from the block substrate at step 550. Excess plaster may have undesirably drooped or slumped over the ends and/or sides of the block substrate. The method 500 may also include allowing the applied plaster composition to harden and/or cure on each block substrate at step 560. The hardened and/or cured plaster composition may beneficially provide the architectural block with the appearance of cut stone.

Figure 6A:
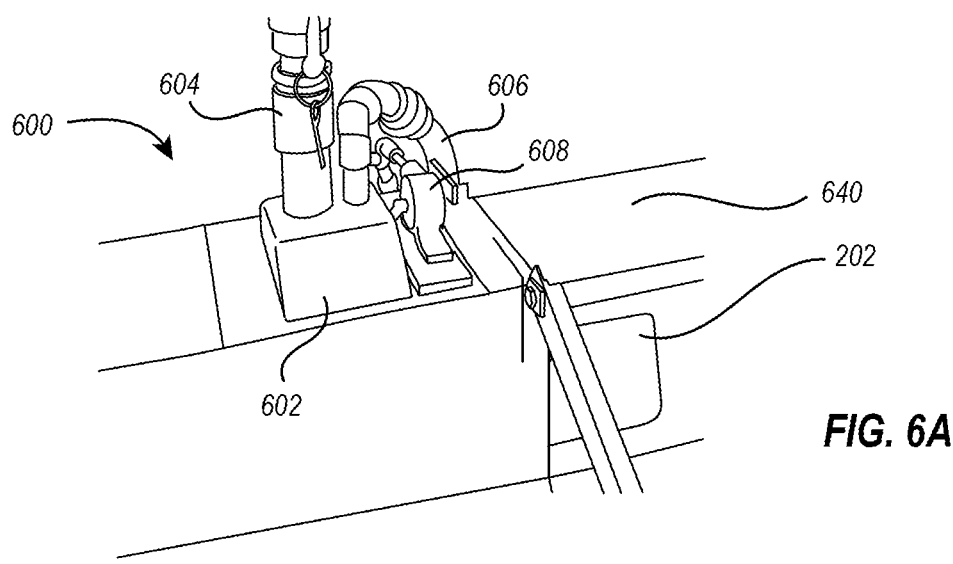
FIGS. 6A-6C are perspective views that illustrate the sequential application of a plaster composition to a block substrate, such as according to the example method of FIG. 5.
Figure 6B:
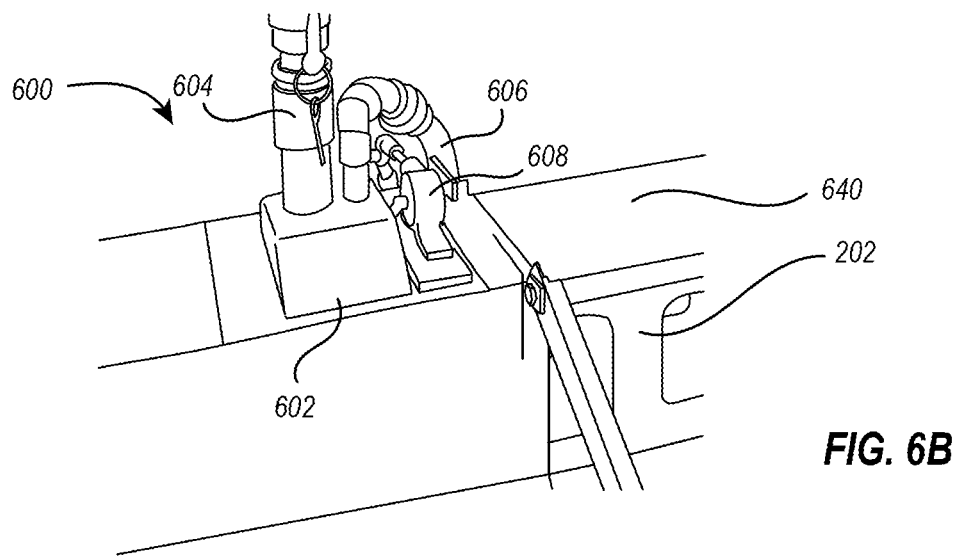
Figure 6C:
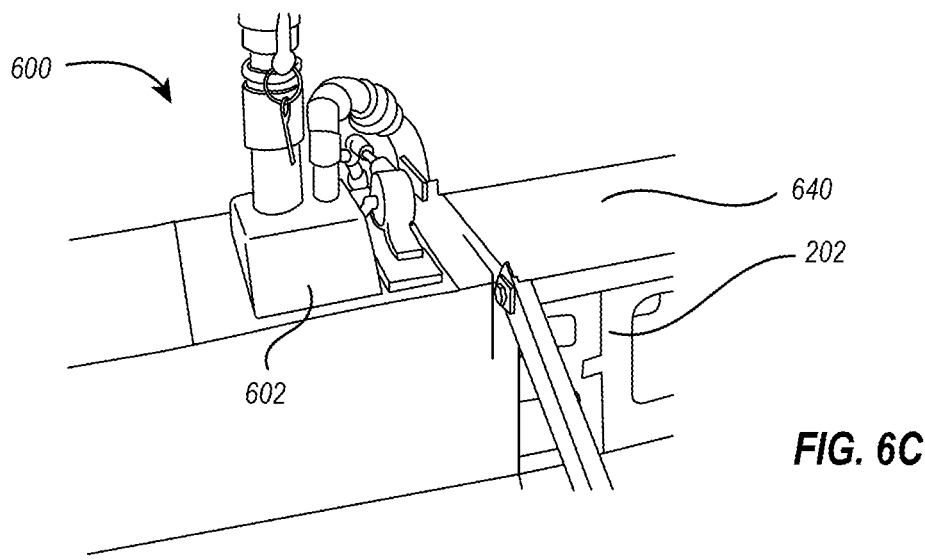

FIGS. 6A-6C illustrate a sequential example of extrusion or application of a plaster composition to a plurality of block substrates 202 according to the method illustrated in FIG. 5. The plurality of block substrates illustrated are block substrates 202 from FIG. 1. Additionally, and/or alternatively, the plurality of block substrates may include the lightweight blocks 302 (such as those in FIG. 3), or other block substrates known in the art. The application apparatus 600 extrudes or applies the plaster composition 640 under pressure, ranging from about 20-40 psi, or about 10-35 psi. The block substrates 202 are moved through the application apparatus 600 by a conveyor, such as a conveyor belt.

The application apparatus includes a manifold 602 configured to distribute fresh plaster onto the block substrate surface. A high pressure hose 604 delivers fresh plaster to the manifold 604. Excess plaster can be discharged or removed from the application apparatus 600 by pressure release/overflow hose 606 connected to the manifold 602. A vibration apparatus 608 assists application of the plaster to the block substrates 202 and removes air bubbles, yielding a more uniform surface with minimum bug holes.

Figure 7:
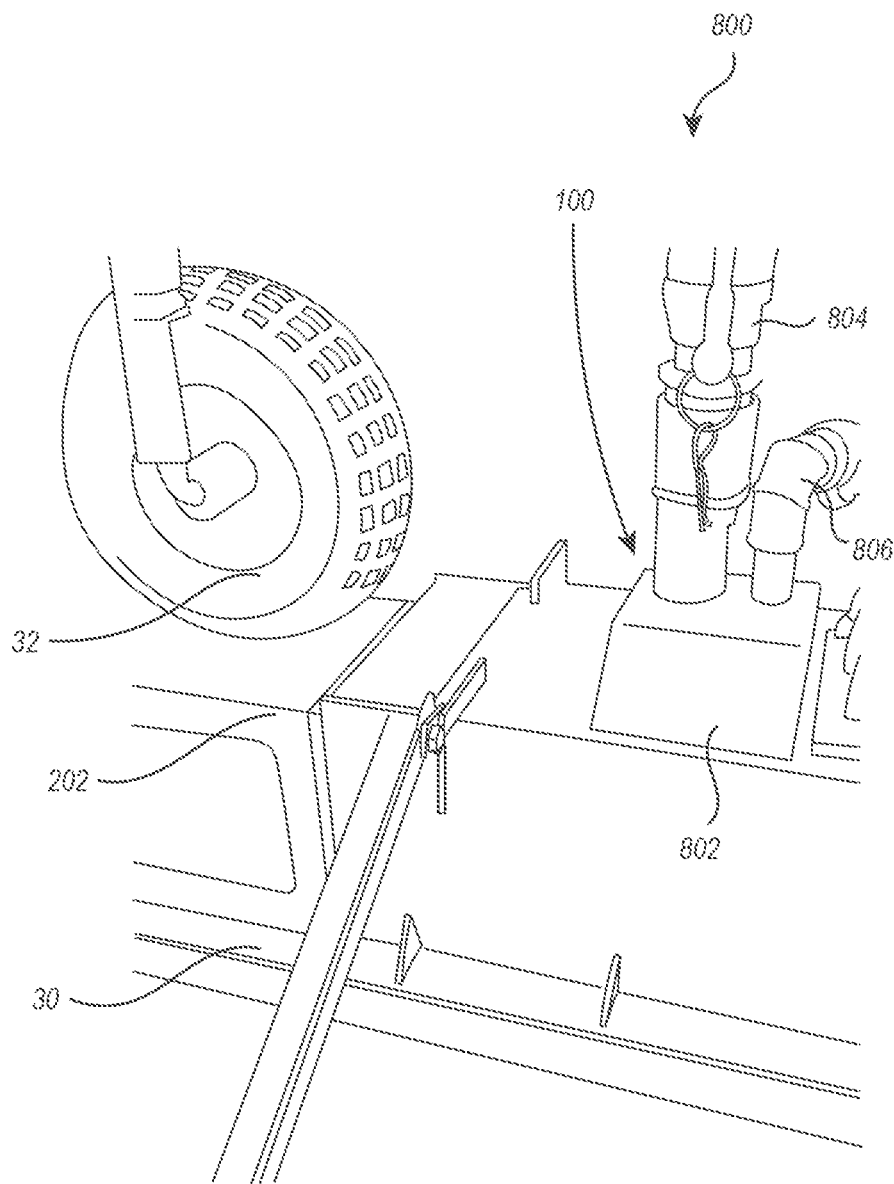
FIG. 7 is a perspective view illustrating exemplary components of an application system.

FIG. 7 illustrates an example application system 800 including an application apparatus 100, a conveyor 30, and a damper 32. The application apparatus 100 is described more fully below with respect to FIG. 10. The block substrate 202 is moved through the application apparatus by conveyor 30, which may be a conveyor belt. The damper 32 stabilizes and helps maintain a desired position of the block substrate 202 as it is moved along the conveyor 30 through the application apparatus 100. As illustrated, the damper 32 is a wheel, though it may be a weight, guide-rails or other appropriate mechanism to maintain the position of the block substrate 202 as it moves through the application apparatus 100. The application system 800 may also include a mixer 700, such as that illustrated in FIG. 9. Further, the application system 800 may include misters or sprayers 35, such as those illustrated in FIGS. 10A-10B.

Figure 8A:
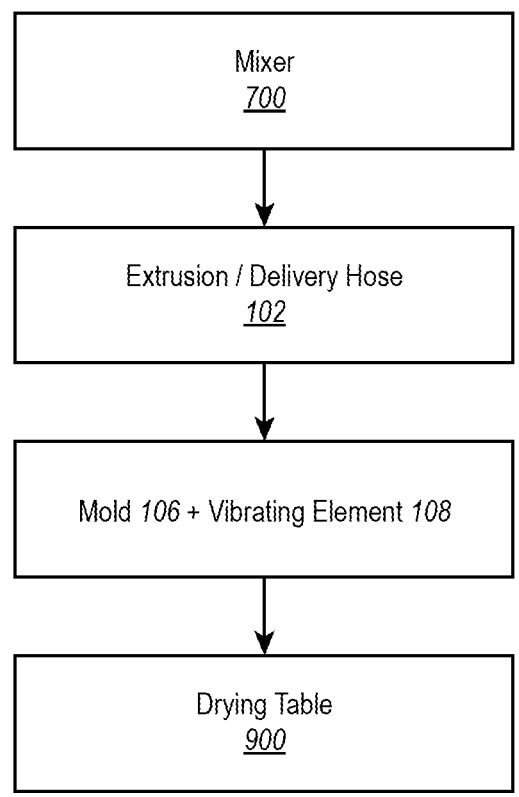
FIG. 8A is a block diagram of an example manufacture and flow of a plaster composition in an application system.

FIG. 8A illustrates an example flowchart for the manufacture and flow of a plaster composition through an application system 800. The plaster composition is mixed in a mixer 700 and then pumped to an extrusion or delivery hose 102. The plaster composition can be pumped to the delivery hose 102 by an auger pump, which pumps the paster composition under pressure (ranging from about 20-40 psi), or other pumps known in the art. The delivery hose 102 delivers the plaster composition to a block substrate (e.g., at a pressure of about 10-35 psi), such as via a manifold, as the block substrate is moved through a mold 106. A vibrating element 108 vibrates the mold 106, the block substrate, and the plaster composition as the plaster is applied and the block passes through the mold apparatus. The block substrate (with an applied plaster composition) is then moved to a holding station where the plaster composition is allowed to harden and/or cure.

Figure 8B:
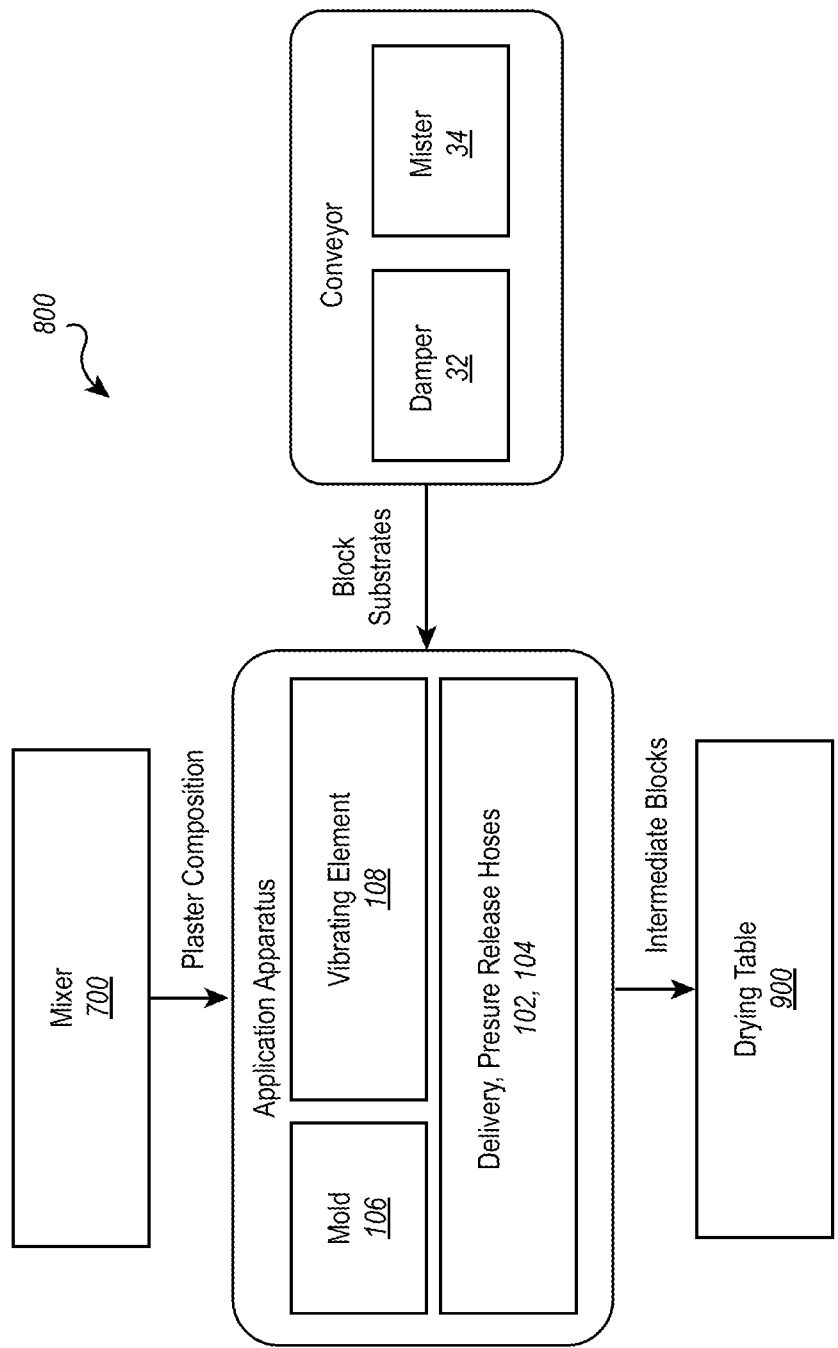
FIG. 8B is a block diagram that provides an overview of an example application system.

FIG. 8B illustrates a schematic block diagram overview of the application system 800. As illustrated, the application system 800 includes a mixer 700, an application apparatus 100, a conveyor 30, and a holding station 900. A plaster composition is pumped from the mixer 700 to the application apparatus 100. Block substrates are moved by the conveyor 30 to the application apparatus 100. The conveyor 30 may similarly move intermediate block substrates (i.e., block substrate and applied plaster composition) through the application apparatus 100 and to the holding station 900. The damper 32 and mister 35 may be disposed along the conveyor 30, for example, along a conveyor belt. The application apparatus includes a manifold 101, a delivery hose 102, and a pressure release hose 104.

Figure 9:
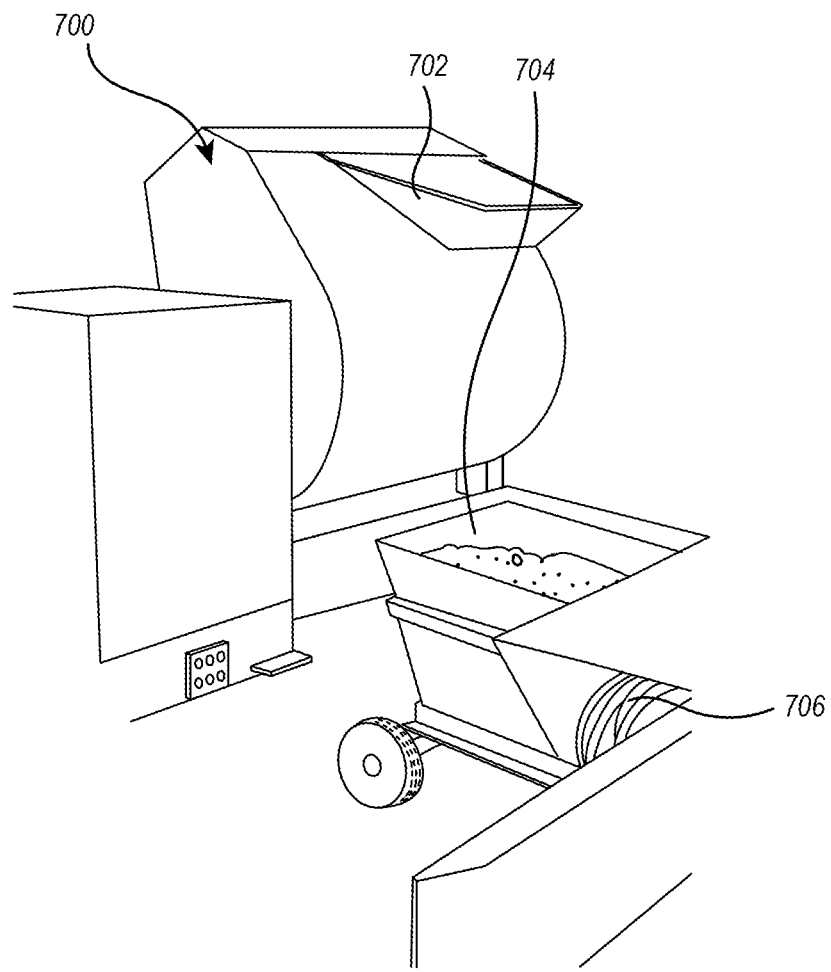
FIG. 9 is a perspective view of an exemplary mixer, extrusion pump, and extrusion line.

FIG. 9 illustrates an example of a mixer 70 for preparing and supplying a fresh plaster composition to a pressurized delivery hose, which conveys the plaster composition to an application apparatus that applies the plaster composition to a surface of a block substrate as one or more plaster layers. The mixer 700 includes a mixing drum 702 with internal mixing blades, a receiving hopper 704, and an auger pump (not illustrated). The auger pump may be positioned at least partially inside the receiving hopper 704. For example, the auger pump may be at the bottom of the receiving hopper 704. The receiving hopper 704 and auger pump deliver the plaster composition (in a plastic, flowable state) to an application apparatus via pump lines 706. The mixing drum 702 includes blades that enable mixing of, for example, a cementitious binder, sand, and water to create the fresh plaster composition that will be applied to a block substrate. The mixing drum 702 is in communication with the receiving hopper 704 and is configured to dump fresh, flowable plaster composition batchwise into the receiving hopper 704. The wet, flowable material is pumped (by the auger pump) under pressure to a pressurized delivery hose for application to at least one surface of a block substrate to produce an architectural block.

Figure 10A:
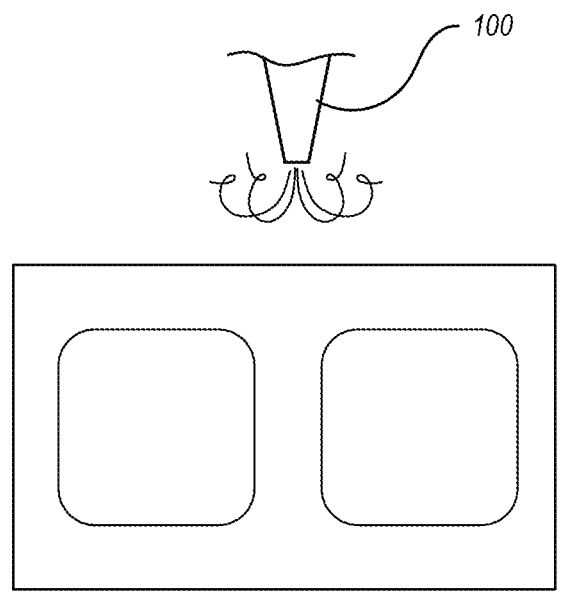
FIGS. 10A-10B schematically illustrate pre-wetting stations for pre-wetting at least one surface of CMUs, ICFs, or other block substrates.
Figure 10B:
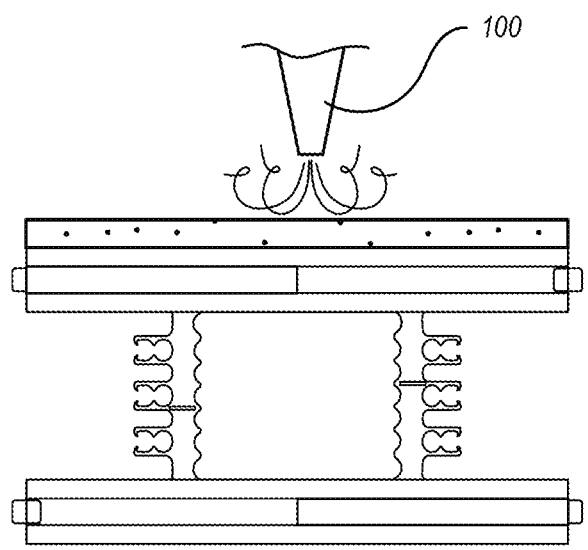
Figure 11A:
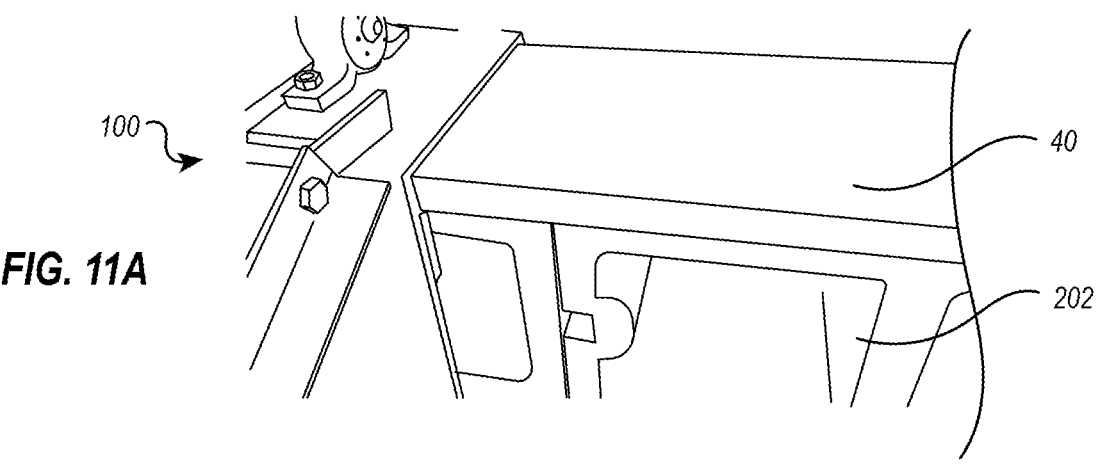
FIGS. 11A-11D are perspective views of another example of sequential extrusion or application of a plaster composition to a plurality of block substrates.
Figure 11B:
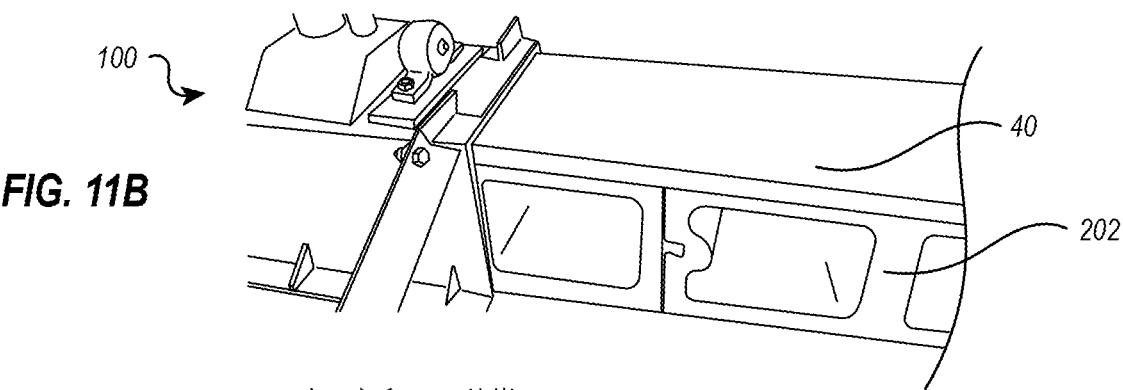
Figure 11C:
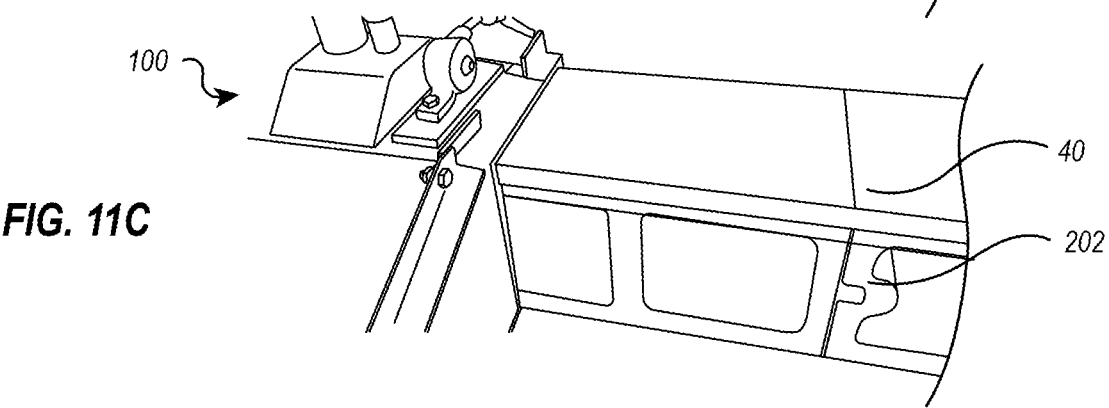
Figure 11D:
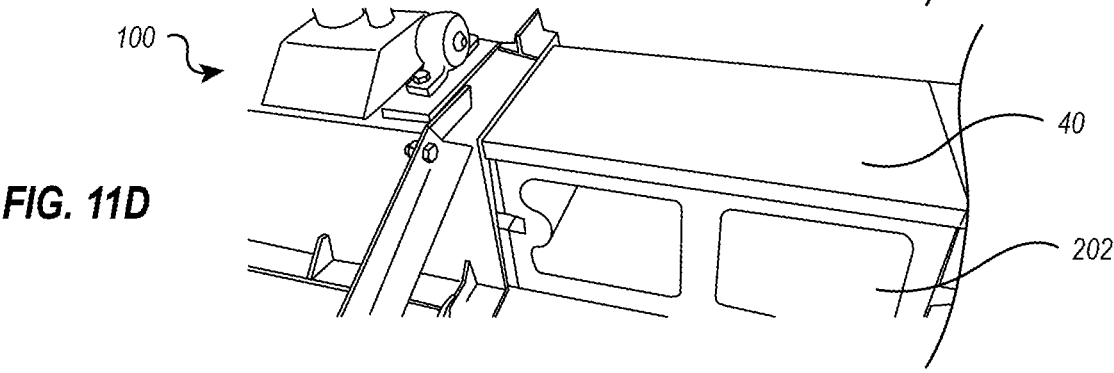

FIGS. 10A-10B illustrate schematic views of pre-wetting stations for pre-wetting at least one surface of either concrete block substrates (FIG. 10A) or ICFs (FIG. 10B). The pre-wetting stations include a mister or sprayer 100 that mists or sprays water (or water-borne adhesive or some other appropriate substance) to at least one surface of the concrete block substrate or ICF. The at least one surface may be the application surface where a plaster composition will be applied. As discussed herein, pre-wetting the application surface of the block substrate or ICF beneficially prepares the application surface for placement of the plaster composition. Such preparation increases the bond strength at the interface between the plaster composition and the block substrate or ICF and reduces the likelihood of delamination and cracking of the hardened plaster composition.

FIGS. 11A-11D illustrate, in a perspective view, an example of a plaster composition being applied to a block substrate. Initially, though not illustrated, the block substrate 202 is misted by a sprayer with water. The mist wets a surface of the block substrate 202, where the plaster composition 40 is to be applied. The block substrate 202 is allowed to "dry" and/or absorb some of the mist applied to the surface. Ideally, the block substrate 202 will be SSD (saturated surface dry) where the surface may appear or feel relatively dry to the touch, but the pores in the block substrate 202 will have absorbed and filled with the applied mist. The plaster composition 40 can then be applied to at least one surface of the block substrate 202.

This is referred to as a "wet application." Such wet application is beneficial because a plaster composition 40 can be prone to cracking when applied to a completely dry porous surface. This is because the pores in the block substrate 202 can readily absorb water present in the applied plaster compositions 40 at the interface, causing the plaster composition 40 to shrink and/or crack. The wet application enables stronger bonding of the plaster composition 40 to the block substrate 202.

As illustrated in FIGS. 11A-11D, a block substrate 202 is moved through an application apparatus 100 (described below with respect to FIG. 12) and one or more layers of a plaster composition 40 are applied to at least one surface of the block substrate 202. The block substrate 200 may be moved through the application apparatus 100 by a conveyance system. A damper, such as damper 30 illustrated in FIG. 9, maintains a position of the block substrate 202 as it moves through the application apparatus 100. The one or more plaster layers 40 applied may be approximately ¼ to ¾ inch thick, or ⅜ to ⅝ inch thick, as the block substrate 202 exits the application apparatus 100. Due to the size and shape of a mold of the application apparatus 100, the one or more layers of plaster composition 40 are levelled as the block substrate 202 is moved through and exits the application apparatus 100. A small amount of the plaster composition 40 may hang or extend off one or more edges of the block substrate 200.

Apparatuses

Figure 12:
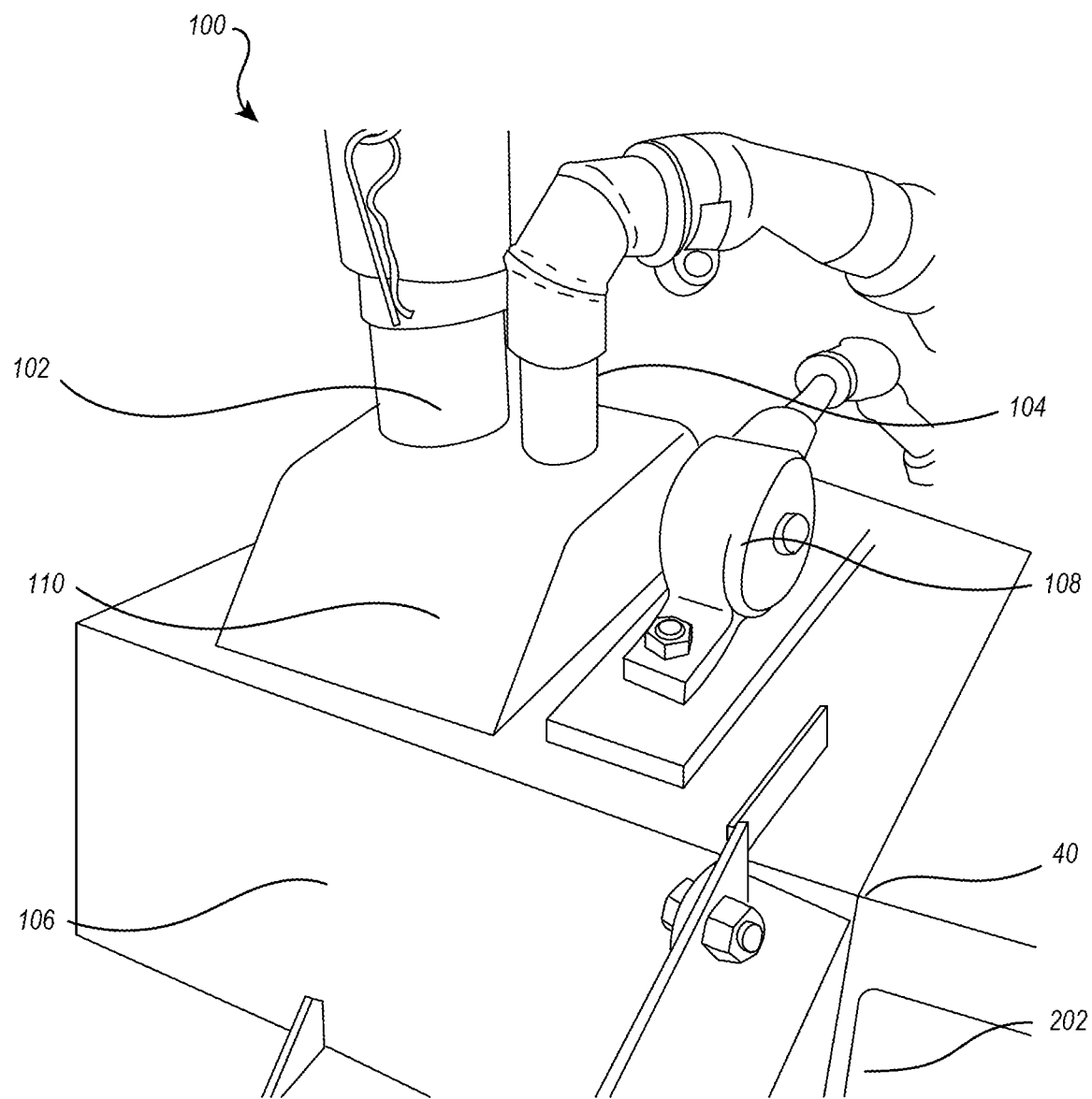
FIG. 12 is a perspective view of an example application apparatus.

FIG. 12 illustrates an example application apparatus 108 for applying a plaster composition to block substrates or ICFs. The apparatus 100 may include a manifold 110, a pressurized delivery hose or conduit 102 that delivers plaster composition to the manifold 110, and a pressure release hose or conduit 104. The apparatus also includes a mold 106 and a vibrating mechanism 108. The mold 106 is sized and shaped to receive the block substrate 202 and allow the block substrate 202 to pass through the mold 106. The mold 106 may include (or define) a channel that is sized and shaped to receive the block substrate 202. As the block substrate 202 moves through the mold 106, the pressurized delivery hose 102 and manifold 110 apply a plaster composition 40 to a surface of the block substrate 202.

The pressurized delivery hose 102 receives the plaster composition 40 from a mixer (see mixer 700, for example, in FIG. 9). The plaster composition 40 is in a flowable, wet, plastic state and preferably has not begun setting up. The pressurized delivery hose delivers the plaster composition to the manifold 110, which applies the plaster composition 40 to a surface of the block substrate 202. The plaster composition 40 can be delivered and applied to the surface of the block substrate 202 at a pressure of approximately 10-45 psi, or approximately 20-40 psi.

Beneficially, applying the plaster composition 40 under pressure reduces air pockets and/or bubbles that usually form during the application of such layers to a surface, such as a block substrate 202. Additionally, applying the plaster composition 40 under pressure ensures the plaster composition 40 flows into the pores in the block substrate 202, enhancing the bond between the surface of the block substrate 202 and the plaster composition 40. The pressure release hose 104 enables release of air and/or excess plaster composition 40 in the manifold 110.

The vibrating mechanism 108 vibrates the entire apparatus 100 while the block substrate 202 is moving through the mold 106. The vibrating mechanism 108 can be an eccentric rotating mass (ERM) vibration motor, a linear resonant actuator (LRAs), a solenoid actuator, a pneumatic turbine vibrator, or a pneumatic piston vibrator. The vibrating mechanism 108 can produce oscillating, reciprocating, periodic, harmonic and/or random vibrations.

An example of a suitable vibrating mechanism 108 is a Vibco VS-130 Pneumatic Turbine Vibrator, which operates using pressurized air. The vibration frequency can be adjusted by altering the air pressure used to run the device. At 60 psi, for example, the device vibrates at a frequency of 8000 VPM (vibrations per minute). At 80 psi, the air flow is 5.5 CFM (cubic feet per minute) and the vibrates at a frequency of 10,000 VPM, with a sound level of 67 dB.

The vibrating mechanism 108 beneficially causes air bubbles to coalesce and burst as the plaster composition 40 is applied to the block substrate 200. Additionally, the vibrating mechanism 108 increases the flow of plaster composition and enables a uniform and even distribution of the plaster composition 40 on the block substrate surface. As the plaster composition 40 is applied, the vibrating mechanism 108 vibrates the mold 106, the manifold 110, and the plaster composition 40. This vibration causes the plaster composition 40 to more evenly spread out across the at least one surface of the block substrate 202, resulting in more even and uniform application of the plaster composition 40.

The mold 106 has a top, opposing sides, and a channel to receive the block substrate 202. The top of the mold 106 has a cavity in communication with the pressurized delivery hose 102 and manifold 110 to enable delivery of the plaster composition 40. The mold 106 and associated channel are sized and shaped to receive the block substrate 202. In some embodiments, a width and a length of the mold 106 may be approximately the same width and length of the block substrate 202, but slightly larger to not grip the block substrate 202. For example, the block substrate 202 may have a width of approximately 8 inches and a length of approximately 16 inches. The mold 106 may then have a width slightly larger than approximately 8 inches and a length slightly larger than approximately 16 inches.

The width of the mold 106 may be just slightly larger than the width of the block substrate 202 so that the block substrate 202 can move through the channel of the mold 106 without getting stuck. For example, the mold 106 may have a width of approximately 8.1 to 8.25 inches to properly accommodate the block substrate 202. The additional space that enables smooth movement of the block substrate 202 through the mold 106 is not so large as to allow a significant amount of the plaster composition 40 to droop or slump down sides of the block substrate 202 as it is being applied. Such drooping or bleeding may occur as the plaster composition 40 has hardened or cured.

The height of the mold 106 is typically greater than a height of the block substrate 202 and, thus, leaves a gap between an inside surface of the top of the mold 106 and a surface of the block substrate 202. The plaster composition 40 applied to the surface of the block substrate 202 advantageously fills the gap. In some embodiments, the gap may be approximately ¼ to ¾ inch in height, or about ⅜ to about ⅝ inch in height, and can be selected based on a desired plaster layer thickness. A top front edge and/or a top back edge of the mold 106 may cause leveling of the plaster composition 40 applied to the block substrate 202 as the block substrate 202 is moved through the mold 106 and passes by the top exit edge of the mold 106.

Figure 13:
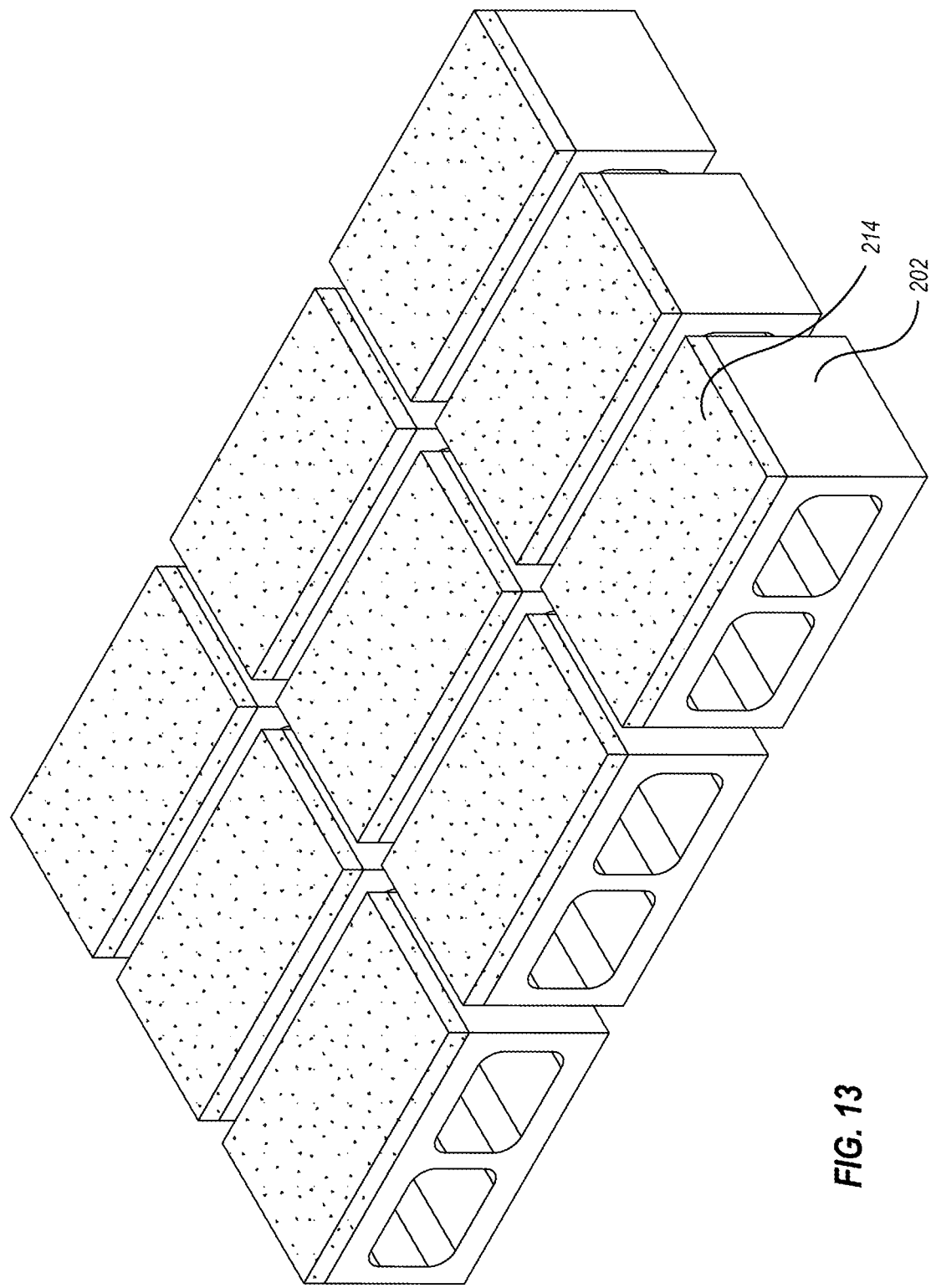
FIG. 13 is a perspective view schematically illustrating a holding station with architectural blocks that have been separated and with a plaster coating allowed to harden or cure.

FIG. 13 illustrates intermediate architectural blocks in which block substrates 202 include an applied plaster layer 214 on one or more surfaces. Blocks 202 are illustrated as being separated from each other in, for example, a drying or moist curing station where the plaster composition 214 is allowed to harden and/or cure. FIG. 13 illustrates the blocks 202 from FIG. 1, but it is to be understood that lightweight blocks 302 from FIG. 3 may also be separated and dried, accordingly.

ADDITIONAL TERMS & DEFINITIONS

While certain embodiments of the present disclosure have been described in detail, with reference to specific configurations, parameters, components, elements, etcetera, the descriptions are illustrative and are not to be construed as limiting the scope of the claimed invention.

Furthermore, it should be understood that for any given element of component of a described embodiment, any of the possible alternatives listed for that element or component may generally be used individually or in combination with one another, unless implicitly or explicitly stated otherwise.

In addition, unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 20%, less than 10%, less than 5%, less than 1%, less than 0.1%, or less than 0.01% of the stated amount, value, or condition. At the very least, and not as an attempt to limit the application of the doctrine of equivalents to the scope of the claims, each numerical parameter should be construed in light of the number of reported significant digits and by applying ordinary rounding techniques.

Any headings and subheadings used herein are for organizational purposes only and are not meant to be used to limit the scope of the description or the claims.

It will also be noted that, as used in this specification and the appended claims, the singular forms "a," "an" and "the" do not exclude plural referents unless the context clearly dictates otherwise. Thus, for example, an embodiment referencing a singular referent (e.g., "widget") may also include two or more such referents.

It will also be appreciated that embodiments described herein may also include properties and/or features (e.g., ingredients, components, members, elements, parts, and/or portions) described in one or more separate embodiments and are not necessarily limited strictly to the features expressly described for that particular embodiment. Accordingly, the various features of a given embodiment can be combined with and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include such features.

The invention claimed is:

1. An apparatus for applying a plaster composition to a block substrate, the apparatus comprising:
   a manifold configured to receive and apply a fresh plaster composition to the block substrate;
   a pressurized delivery hose or conduit connected to a top of the manifold and configured to deliver the fresh plaster composition to the manifold;
   a mold connected to the manifold, the mold comprising a channel configured to receive the block substrate; and
   a vibrating mechanism connected to the mold adjacent to the manifold,
   wherein the channel is sized to leave a gap between an inside surface of the mold and at least one surface of the block substrate when the block substrate is received in the channel.

2. The apparatus of claim 1, wherein the pressurized delivery hose is configured to deliver the fresh plaster composition to the manifold at a pressure of about 10-40 psi.

3. The apparatus of claim 1, wherein the gap between the inside surface of the mold and the at least one surface of the block substrate is approximately ¼ to ¾ inch.

4. The apparatus of claim 1, wherein the vibrating mechanism is configured to reduce or eliminate air bubbles in the fresh plaster composition applied to the block substrate.

5. The apparatus of claim 1, wherein:
   a length of the mold is approximately equal to a length of the block substrate;
   a width of the mold is approximately equal to or slightly greater than a width of the block substrate; and
   a height of the mold is slightly greater than a height of the block substrate.

6. The apparatus of claim 5, wherein the height of the mold is approximately ¼ inch to ¾ inch greater than the height of the block substrate.

7. The apparatus of claim 1, further comprising a pressure release hose attached to the manifold to release pressurized air and/or excess plaster composition from the manifold.

8. A system for applying a plaster composition to block substrates, the system comprising:
   an application apparatus, the application apparatus comprising:
      a manifold,
      a mold defining a channel configured to receive the block substrates,
      a pressurized delivery hose or conduit connected to a top of the manifold, and
      a vibrating mechanism connected to the mold adjacent to the manifold; and
   a conveyance system configured to move the block substrates through the channel of the mold.

9. The system of claim 8, further comprising a sprayer configured to wet a surface of the block substrates prior to passing through the channel of the mold.

10. The system of claim 8, further comprising a damper connected to the application apparatus and configured to maintain a position of the block substrates as they move through the channel of the mold.

11. The system of claim 8, wherein:
    a length of the mold is approximately equal to a length of the block substrate;
    a width of the mold is approximately equal to or slightly greater than a width of the block substrate; and
    a height of the mold is slightly greater than a height of the block substrate.

12. The system of claim 8, wherein a height of the mold is greater than a height of the block substrate, leaving a gap of approximately ¼ inch to ¾ inch between an inside surface of the mold and a surface of the block substrate.

13. The system of claim 12, wherein the manifold is configured to apply the plaster composition to the surface of the block substrate and so that the plaster composition fills the gap between the inside surface of the manifold and the surface of the block substrate.

14. The apparatus of claim 1, wherein the vibrating mechanism is configured to vibrate at a frequency of about 6,000 to about 11,000 VPM.

15. The apparatus of claim 1, wherein the gap between the inside surface of the mold and the at least one surface of the block substrate is approximately ⅜ to ⅝ inch.

16. The apparatus of claim 1, further comprising a conveyor configured to move the block substrate through the channel of the mold.

17. The apparatus of claim 1, further comprising a sprayer configured to wet a surface of the block substrate prior to passing through the channel of the mold.

18. The apparatus of claim 1, further comprising a damper configured to maintain a position of the block substrate as it moves through the channel of the mold.

19. The system of claim 8, wherein the vibrating mechanism is configured to vibrate at a frequency of about 6,000 to about 11,000 VPM.

20. The system of claim 8, wherein the pressurized delivery hose is configured to deliver a fresh plaster composition to the manifold.

* * * * *